United States Patent
Kawahata (10) Patent No.: US 7,418,206 B2
(45) Date of Patent: Aug. 26, 2008

(54) CONTROL METHOD OF WAVELENGTH DISPERSION COMPENSATOR, AND WAVELENGTH DISPERSION COMPENSATOR

(75) Inventor: Yuichi Kawahata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 900 days.

(21) Appl. No.: 10/808,579

(22) Filed: Mar. 25, 2004

(65) Prior Publication Data

US 2005/0047786 A1    Mar. 3, 2005

(30) Foreign Application Priority Data

Sep. 3, 2003    (JP) ............... 2003-311083

(51) Int. Cl.
H04J 14/02    (2006.01)

(52) U.S. Cl. .................. 398/81; 398/29; 398/147; 398/148; 398/149; 398/158; 398/159; 398/192; 398/193; 398/194; 359/337.5; 359/584; 359/589

(58) Field of Classification Search .......... 398/29, 398/81, 147–149, 158–159, 192–194; 359/589, 359/584, 337.5

See application file for complete search history.

(56) References Cited

U.S. PATENT DOCUMENTS

| 5,930,045 A | * | 7/1999 | Shirasaki ................ 359/577 |
| 6,304,382 B1 | | 10/2001 | Shirasaki et al. |
| 6,370,300 B1 | * | 4/2002 | Eggleton et al. ............ 385/37 |
| 6,392,807 B1 | | 5/2002 | Barbarossa et al. |
| 6,807,008 B2 | * | 10/2004 | Mitamura ................ 359/577 |

(Continued)

FOREIGN PATENT DOCUMENTS

EP    1 237 308    9/2002

(Continued)

OTHER PUBLICATIONS

M.Shirasaki "Chromatic-Dispersion Compensator Using Virtually Imaged Phased Array" IEEE Photonics Technology Letter,vol. 9,No. 12, Dec. 1997.*

(Continued)

*Primary Examiner*—Kenneth Vanderpuye
*Assistant Examiner*—Lin Phyowai
(74) *Attorney, Agent, or Firm*—Staas & Halsey LLP (57) ABSTRACT

It is an object of the present invention to provide a control technique for reducing wavelength dependence of wavelength dispersion values and also for suppressing a change in wavelength transmission characteristic with a temperature variation or the like, in a VIPA-type wavelength dispersion compensator. In order to achieve the object, the present VIPA-type wavelength dispersion compensator comprises: a VIPA plate capable of emitting incident lights in different directions according to wavelengths; a free-form surface mirror reflecting, at a previously set position, the lights of respective wavelengths emitted from the VIPA plate to return the reflected lights to the VIPA plate; a case provided with a heater which variably changes the temperature of the VIPA plate, a temperature sensor measuring the temperature of the VIPA plate and the ambient temperature; and a control section that reads out data which is measured or the like before starting the operation to be stored in a storing section, according to the measurement result of the temperature sensor, and optimizes the position of the free-form surface mirror and the temperature of the VIPA plate based on the read data.

14 Claims, 8 Drawing Sheets

U.S. PATENT DOCUMENTS

| | | | |
|---|---|---|---|
| 7,006,770 B2 * | 2/2006 | Akiyama et al. | 398/159 |
| 7,200,297 B2 * | 4/2007 | Yamauchi et al. | 385/15 |
| 2001/0046077 A1 | 11/2001 | Akiyama et al. | |
| 2002/0089724 A1 * | 7/2002 | Nishimoto et al. | 359/161 |
| 2002/0114570 A1 | 8/2002 | Matsumoto et al. | |
| 2003/0234922 A1 * | 12/2003 | Asahina et al. | 356/73.1 |
| 2004/0027690 A1 * | 2/2004 | Takahashi | 359/726 |

FOREIGN PATENT DOCUMENTS

| | | |
|---|---|---|
| JP | 09-043057 | 2/1997 |
| JP | 2000-511655 | 9/2000 |
| JP | 2003-060577 | 2/2003 |
| JP | 2003-202476 | 7/2003 |
| WO | WO 98/35259 | 8/1998 |

OTHER PUBLICATIONS

European Search Report mailed Jun. 8, 2007 issued with respect to the corresponding European Patent Application No. 04007414.8-1246.

Communication from the Japanese Patent Office mailed Mar. 4, 2008.

* cited by examiner

RELATED ART

FIG.7

RELATED ART

FIG.8

RELATED ARIT

RELATED ART

US 7,418,206 B2

CONTROL METHOD OF WAVELENGTH DISPERSION COMPENSATOR, AND WAVELENGTH DISPERSION COMPENSATOR

FIELD OF THE INVENTION

The present invention relates to a control technique for realizing wavelength dispersion compensation with high accuracy for a wavelength dispersion compensator configured utilizing an optical component provided with a function for demultiplexing a wavelength division multiplexed (WDM) light according to wavelengths.

DESCRIPTION OF THE RELATED ART

There has been proposed a configuration utilizing so-called a virtually imaged phased array (VIPA) for demultiplexing a WDM light into a plurality of optical beams that can be distinguished spatially according to wavelengths, as one of conventional wavelength dispersion compensators (refer to Japanese Unexamined Patent Publication No. 9-43057 and Japanese National Publication No. 2000-511655).

Figure 6:
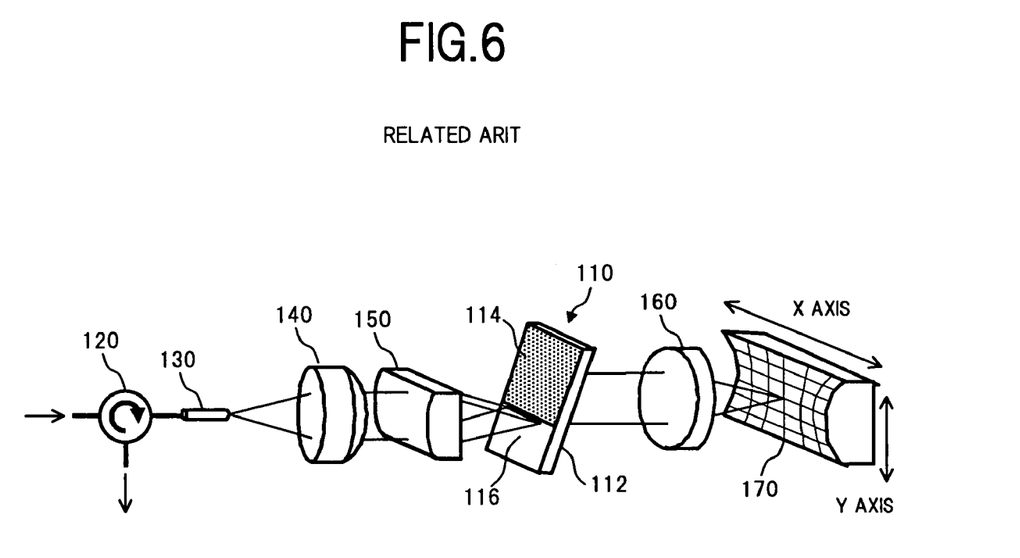
FIG. 6 is a perspective view showing a configuration example of a conventional VIPA-type wavelength dispersion compensator.
Figure 7:
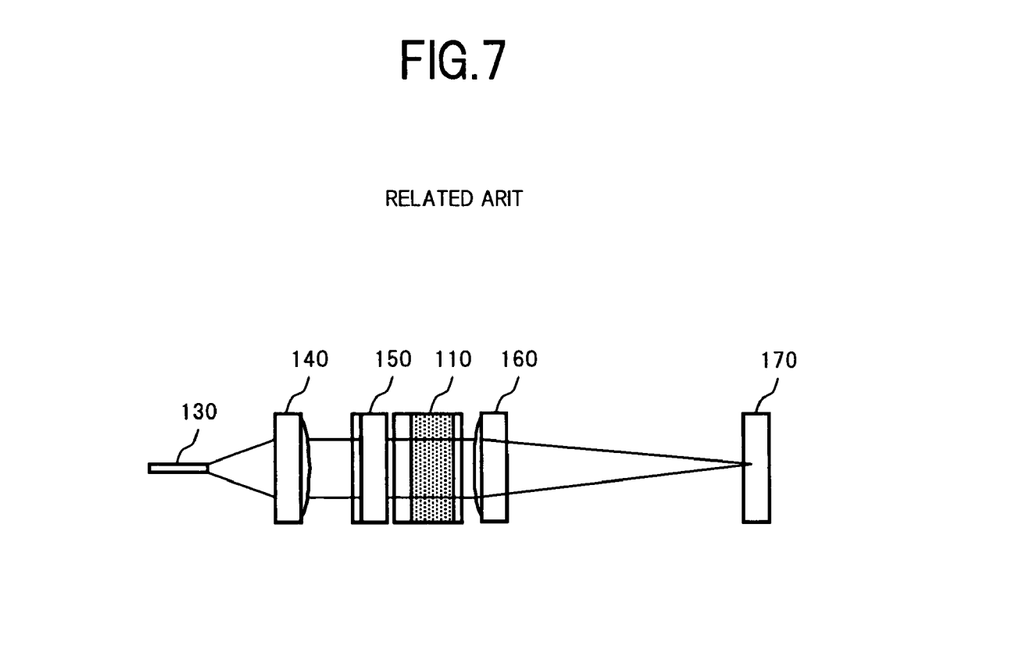
FIG. 7 is a top view of the configuration example of FIG. 6.

FIG. 6 is a perspective view showing a configuration example of a conventional VIPA-type wavelength dispersion compensator. Further, FIG. 7 is a top view of the configuration example of FIG. 10.

As shown in each figure, in the conventional VIPA-type wavelength dispersion compensator, a WDM light emitted from one end of an optical fiber 130 via an optical circulator 120 is converted into a parallel light by a collimate lens 140 and, then, condensed on one segment by a line focal lens 150 and passes through a radiation window 116 of a VIPA plate 110 to be incident between opposed parallel planes. The incident light on the VIPA plate 110 is multiple reflected repeatedly, for example, between a reflective multilayer film 112 formed on one plane of the VIPA plate 110 and having the reflectance lower than 100% and a reflective multilayer film 114 formed on the other plane and having the reflectance of substantially 100%. At this time, every time the incident light is reflected on the surface of the reflective multilayer film 112, a few % of the light is transmitted through the surface to be emitted outside the VIPA plate 110.

The lights transmitted through the VIPA plate 110 interfere mutually and generate a plurality of optical beams, traveling directions of which are different from each other, according to wavelengths. As a result, if each of the optical beams is condensed to one point by a convergent lens 160, each condensed position moves on a straight line according to variation of the wavelengths. By disposing, for example, a free-form surface mirror 170 on the straight line, the lights that have been emitted from the VIPA plate 110 and condensed by the convergent lens 160 are reflected at different positions on the free-form surface mirror 170 according to respective wavelengths to be returned to the VIPA plate 110. Since the lights reflected on the free-form surface mirror 170 are propagated through an optical path in a direction exactly opposite to that of the optical path through which the lights have been propagated previously, different wavelength components are propagated for different distances and, therefore, the wavelength dispersion of the WDM light is compensated.

Figure 8:
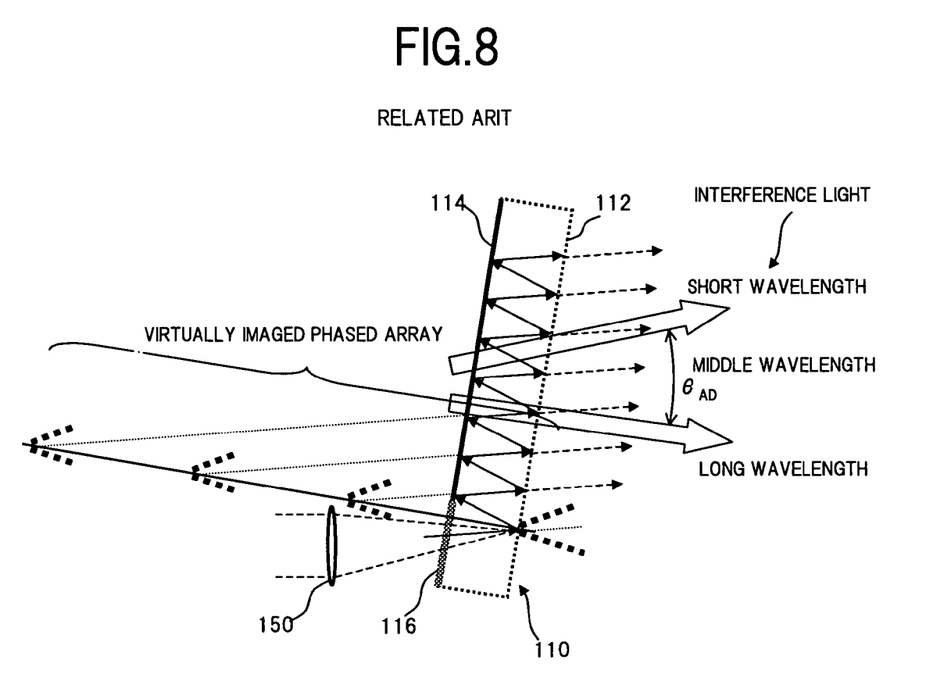
FIG. 8 is a diagram showing a model for explaining an operation theory of a conventional VIPA-type wavelength dispersion compensator.

In consideration of a model as shown in FIG. 8, for example, behavior of the light that is multiple-reflected by the VIPA plate 110 as described above is similar to that in an Echelon grating that is a well-known step-wise diffraction grating. Therefore, the VIPA plate 110 can be considered as a virtual diffraction grating. Further, in consideration of an interference condition in the VIPA plate 110, as shown on the right side in FIG. 8, the emitted light interferes under a condition in which an optical axis thereof as a reference, a shorter wavelength is above the optical axis and a longer wavelength is below the optical axis, and therefore, among a plurality of optical signals contained in the WDM light, optical signals on the shorter wavelength side are output above the optical axis and optical signals on the longer wavelength side are output below the optical axis.

Figure 9:
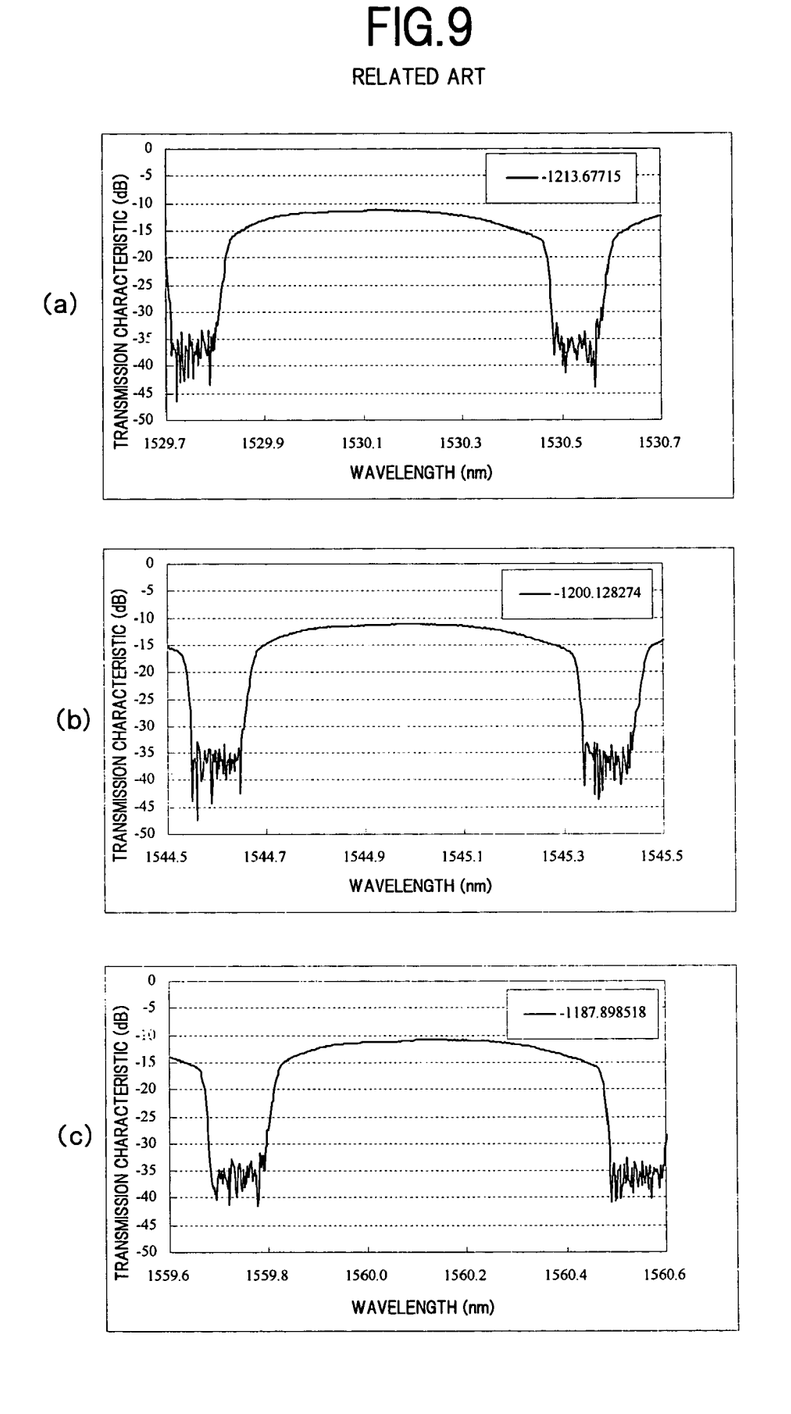
FIG. 9 is a diagram for explaining an error in wavelength dispersion values occurring caused by the wavelength dependence of angular dispersion in a VIPA plate.

In the conventional VIPA-type wavelength dispersion compensator as described above, it has been known that the angular dispersion occurred in the VIPA plate 110 has the wavelength dependence at a spectral angle per unit wavelength. In the VIPA-type wavelength dispersion compensator, a shape of the free-form surface mirror 170 is optimally designed, so that the arbitrary wavelength dispersion occurs with the center wavelength of a wavelength band of the WDM light or the like as a reference. However, there is a problem in that, due to the wavelength dependence of the angular dispersion in the VIPA plate 110 as described above, an optimum wavelength of the free-form surface mirror 170 relative to a desired wavelength dispersion value is only the center wavelength which is the reference of designing, and therefore, the larger an error to the desired wavelength dispersion value becomes, as an optical wavelength is away from the center wavelength. To be specific, an example thereof is shown in (a) to (c) of FIG. 9. (a) to (c) of FIG. 9 shows a difference between each dispersion value in each wavelength in the case where a transmission loss in each wavelength is fixed. Namely, (a) of FIG. 9 shows a transmission characteristic on a shorter wavelength side in C-band, (b) of FIG. 9 shows a transmission characteristic in the vicinity of the center wavelength in C-band, and (c) of FIG. 9 shows a transmission characteristic on a longer wavelength side in C-band. In the case where the VIPA-type wavelength dispersion compensator is designed so that a wavelength dispersion value of −1200 ps/nm can be obtained in the vicinity of the center wavelength shown in (b) of FIG. 9, since an angular dispersion difference of about 0.01° occurs in C-band, a wavelength dispersion value of about −1214 ps/nm can be obtained on the shorter wavelength side shown in (a) of FIG. 9, and a wavelength dispersion value of about −1188 ps/nm can be obtained on the longer wavelength side shown in (c) of FIG. 9.

Figure 10:
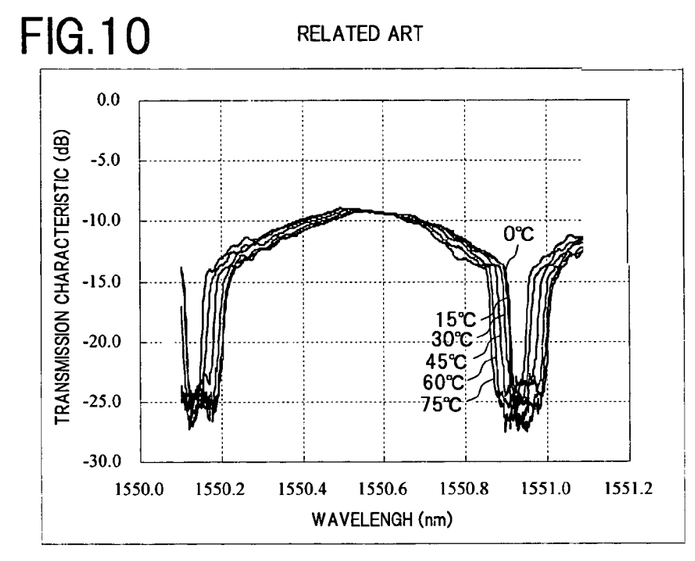
FIG. 10 is a diagram exemplarily showing a state in which a wavelength transmission characteristic is shifted to a wavelength axis direction relative to a temperature change in the VIPA plate.

Further, since the known VIPA plate 110 is manufactured using a substance having the linear thermal-expansion and a substance having a refractive index change depending on temperature, when the temperature of ambient (for example, air) is varied, a wavelength transmission characteristic (etalon transmission periodic characteristic) is changed, resulting in a problem that an insertion loss characteristic in a transmission band of the VIPA-type wavelength dispersion compensator. For example, as shown in FIG. 10, when the temperature of the VIPA plate 110 is changed within a range of 0 to 75° C., the wavelength transmission characteristic is shifted to a wavelength axis direction, so that the transmissivity to a required signal light wavelength is changed depending on the temperature.

Figure 11:
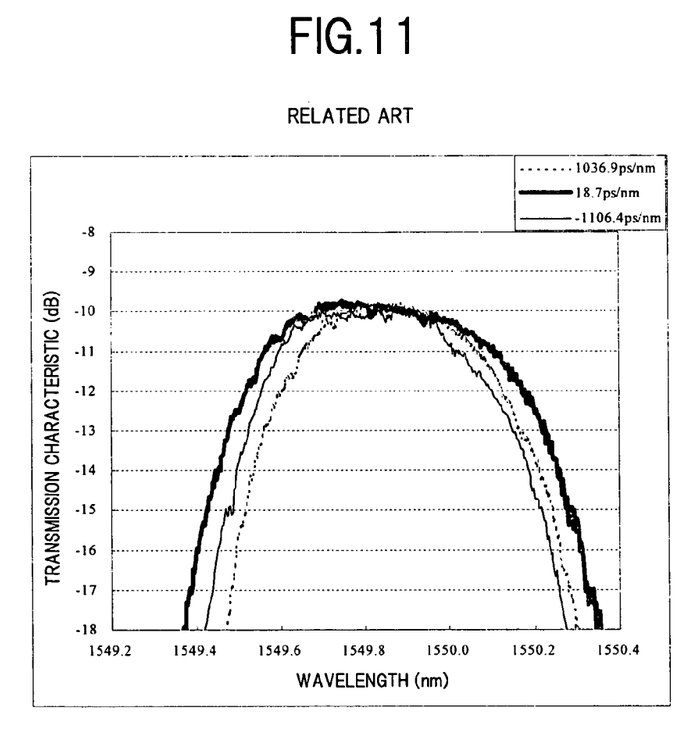
FIG. 11 is a diagram exemplarily showing a state in which the wavelength transmission characteristic is changed according to the setting of the wavelength dispersion values in the conventional VIPA-type wavelength dispersion compensator.

Moreover, there is also a problem in that, even if the ambient temperature of the VIPA-type wavelength dispersion compensator is controlled to be fixed, when the setting of the wavelength dispersion value is changed by moving the free-form surface mirror 170 or the like, the wavelength transmission characteristic of the VIPA-type wavelength dispersion compensator is changed. To be specific, for example as shown in FIG. 11, when in the fixed ambient temperature, the setting of wavelength dispersion values is changed to 1036.9 ps/nm, 18.7 ps/nm and −1106 ps/nm, the center wavelength of the transmission band, a minimum insertion loss value and the like are also changed depending on the respective wavelength dispersion values. In the VIPA-type wavelength dispersion compensator having such a characteristic, it is hard to stably compensate for the arbitrary wavelength dispersion occurred in the WDM light.

SUMMARY OF THE INVENTION

The present invention has been accomplished in view of the above problems and has an object to provide a control technique for reducing the wavelength dependence of wavelength dispersion values in a wavelength dispersion compensator. Further, the present invention has an object to provide a control technique for suppressing a change in wavelength transmission characteristic with a variation of ambient temperature or a change in setting of wavelength dispersion value.

In order to achieve the above objects, the present invention provides a control method of a wavelength dispersion compensator which comprises: an optical component provided with a demultiplexing function, including a device having two reflective surfaces which are opposed and parallel to each other, in which a light condensed in the one-dimensional direction is incident between the reflective surfaces of the device, and a part of the incident light is transmitted through one of the reflective surfaces while the incident light being multiple-reflected on the respective reflective surfaces, to be emitted, and the emitted light interferes mutually, so that optical beams traveling directions of which are different from each other according to wavelengths are formed; and a reflector reflecting, at a previously set position, optical beams of respective wavelengths emitted from one of the reflective surfaces of the optical component in different directions to return the optical beams to the optical component, respectively. A first aspect of this control method comprises the following respective processes: (1) acquiring to store data relating to wavelength dispersion values in respective wavelengths in a wavelength band of the incident light so as to correspond to a position of the reflector, before starting the operation of wavelength dispersion compensation by the wavelength dispersion compensator; (2) inputting a setting condition inclusive of the wavelength dispersion values to be compensated at the operation time and wavelength information of the incident light; (3) reading out the data corresponding to the setting condition from the stored data, and based on the read data, judging the position which enables the reduction of wavelength dependence of the wavelength dispersion values in the operation time; and (4) controlling the position of the reflector in accordance with the judgment result, to start the operation of wavelength dispersion compensation. According to this control method, since the position of the reflector is optimized so as to correspond to the wavelengths of lights incident on the wavelength dispersion compensator, it becomes possible to reduce the wavelength dependence of the wavelength dispersion values.

A second aspect of the control method according to the present invention comprises the following respective processes: (1) acquiring to store data relating to a wavelength transmission characteristic of the optical component so as to correspond to the temperature of the optical component, before starting the operation of wavelength dispersion compensation by the wavelength dispersion compensator; (2) inputting a setting condition inclusive of the wavelength dispersion values to be compensated at the operation time and wavelength information of the incident light; (3) measuring the temperature of the optical component; (4) reading out the data corresponding to the setting condition and the temperature of the optical component from the stored data, and based on the read data, judging the temperature of the optical component, at which a parameter being a reference of the wavelength transmission characteristic of the optical component is substantially fixed; and (5) controlling the temperature of the optical component in accordance with the judgment result, to start the operation of wavelength dispersion compensation. According to this method, since the temperature of the optical component is optimized, it becomes possible to suppress a change in wavelength transmission characteristic with a variation of ambient temperature or a change in setting of the wavelength dispersion values.

In the control methods of the wavelength dispersion compensator according to the first and second aspects as described above, since the position control of the reflector and the temperature control of the optical component are performed independently, it is possible to combine the respective controls with each other. Further, the wavelength dispersion compensator of the present invention is configured by applying the control method as above described.

By combining the temperature control of the optical component and the position control of the reflector, it becomes possible to adjust the dispersion values and the transmission characteristic to optimum values.

The other objects, features and advantages of the present invention will be apparent from the following description of the embodiments with reference to the accompanying drawings.

DETAILED DESCRIPTION OF THE INVENTION

Hereinafter, embodiments of the present invention will be described with reference to drawings.

Figure 1:
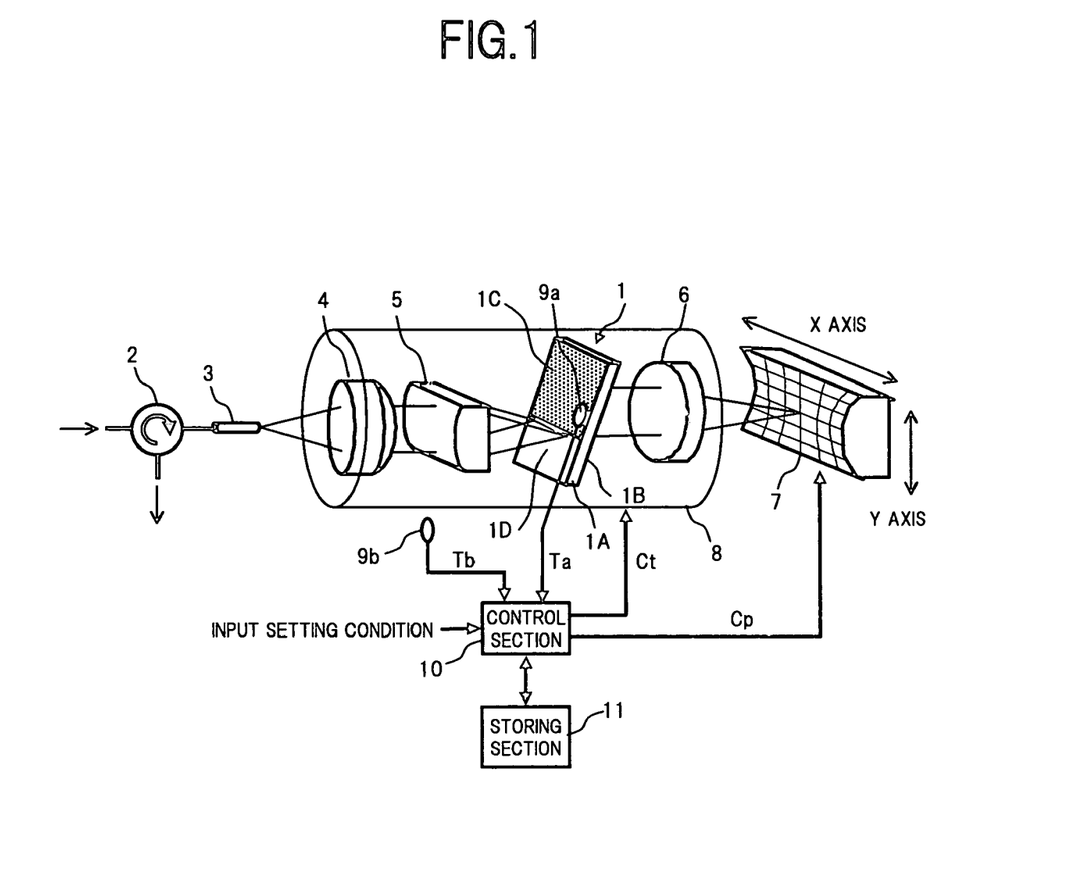
FIG. 1 is a functional block diagram showing a configuration of one embodiment of a wavelength dispersion compensator according to the present invention.

FIG. 1 is a functional block diagram showing a configuration of one embodiment of a wavelength dispersion compensator according to the present invention.

In FIG. 1, the wavelength dispersion compensator of the first embodiment comprises, for example: a VIPA plate 1 as a device having two reflective surfaces which are opposed and parallel to each other; an optical system which consists of an optical circulator 2, an optical fiber 3, a collimate lens 4 and a line focal lens 5, enabling a WDM light condensed on a segment to be incident on a radiation window 1D of the VIPA plate 1; a convergent lens 6 condensing an optical beam that has been multiple-reflected by the VIPA plate 1 to be emitted from one of the parallel surfaces, on one point; a free-form surface mirror 7 serving as a reflector, for reflecting the light condensed by the convergent lens 6 at a required position to return the light to the VIPA plate 1 via the convergent lens 6; a case 8 which accommodates therein required optical components inclusive of the VIPA plate 1, and is provided with a heater adjusting the temperature of the VIPA plate 1; a first temperature sensor 9a measuring the temperature of the VIPA plate 1 and a second temperature sensor 9b measuring the ambient temperature of the present wavelength dispersion compensator; and a control section 10 that controls a position of the free-form surface mirror 7 and the temperature of the VIPA plate 1, based on the temperatures measured by the temperature sensors 9a and 9b, respectively, and data stored in a storing section 11.

Similar to the VIPA 110 used in the conventional configuration shown in FIG. 6 to FIG. 8 described above, the VIPA plate 1 includes a glass plate 1A provided with parallel planes opposed to each other, a reflective multilayer film 1B formed on one of the parallel planes of the glass plate 1A, and a reflective multilayer film 1C and the radiation window 1D formed on the other of the parallel planes. Note, the VIPA plate 1 is tilted by a required angle from an angle at which an optical axis of the light incident on the radiation window 1D is incident vertically.

The glass plate 1A is manufactured using a substance having the linear thermal-expansion and a refractive index change depending on temperature. To be specific, it is possible to manufacture the glass plate 1A using a known material, for example, "glass-TIH53" produced by OHARA Co., Ltd. Note, the material used for the glass plate 1A is not limited to that described above.

The reflective multilayer film 1B has the reflectance lower than 100% (preferably about 95-98%) with respect to the WDM light incident from the radiation window 1D and is formed on the entirety of one of the planes of the glass plate 1A. On the other hand, the reflective multilayer film 1C has the reflectance of substantially 100% with respect to the WDM light incident from the radiation window 1D and is formed on a part of the other plane of the glass plate 1A. Another part of the other plane, on which the reflective multilayer film 1C is not formed, is the radiation window 1D transparent to the WDM light.

The optical circulator 2 is a typical optical component including three ports, for example, and transmitting a light in directions from a first port to a second port, from the second port to a third port and from the third port to the first port. Here, the WDM light input to the present wavelength dispersion compensator is given to the first port of the optical circulator 2 and sent to one end of the optical fiber 3 via the second port, while the WDM light returned to the other end of the optical fiber 3 is output from the third port via the second port as an output light of the present wavelength dispersion compensator.

The optical fiber 3 is, for example, a single-mode optical fiber and the like, one end thereof being connected with the second port of the optical circulator 2 and the other end being arranged in the vicinity of the collimate lens 4. Note, the type of the optical fiber 3 is not limited to that described above.

The collimate lens 4 is a typical lens converting an optical beam emitted from the other end of the optical fiber 3 into a parallel light to supply it to the line focal lens 5.

The line focal lens 5 condenses the parallel light from the collimate lens 4 on one segment and, more specifically, it may be a cylindrical lens, a gradient index lens or the like.

The convergent lens 6 is a typical lens condensing on one point, a plurality of optical beams that are multiple-reflected by the VIPA plate 1 to be emitted from the side of the reflective multilayer film 1B, and interfere mutually so that traveling directions of which are different for every wavelengths.

The free-form surface mirror 7 has, for example, a three-dimensional structure in which the surface thereof is aspheric, and there is a central axis acting as a design reference on the aspheric mirror. This free-form surface mirror 7 is attached to a movable stage (not shown) serving as a position adjusting section and arranged so that a traveling axis of the movable stage is parallel to respective directions of the central axis (in an X-axis direction in FIG. 1). The free-form surface mirror 7 is moved in an X-axis direction or a Y-axis direction by the movable stage, in accordance with a control signal Cp from the control section 10 as described later.

The case 8 is a cylindrical container or the like, provided with a film heater (not shown in the figure) serving as a temperature adjusting section, on a side surface thereof, and here, the collimate lens 4, the line focal lens 5, the VIPA plate 1 and the convergent lens 6 are accommodated at predetermined positions inside the container. An operation of the film heater is controlled in accordance with a control signal Ct from the control section 10 as described later.

The temperature sensor 9a is attached to, for example, an outer surface of the reflective multilayer film 1C of the VIPA plate 1, and outputs a signal Ta indicating the measured temperature of the VIPA plate 1. Note, the attachment position of the temperature sensor 9a is not limited to the position described above, and it is possible to attach the temperature sensor 9a to an arbitrary position at which the temperature of the VIPA plate 1 can be measured. On the other hand, the temperature sensor 9b is attached to, for example, the outside of the case 8, and measures the temperature of the ambient in which the present wavelength dispersion compensator is disposed, to output a signal Tb indicating the measurement result to the control section 10. The temperature measured by the temperature sensor 9b is hardly influenced by the operating state of the film heater of the case 8.

The control section 10 sends to the movable stage the control signal Cp optimizing the position of the free-form surface mirror 7 in order to reduce the wavelength dependence of wavelength dispersion values, based on the measurement results in the respective temperature sensors 9a and 9b, and the data stored in the storing section 11, and also sends to the film heater the control signal Ct optimizing the temperature of the VIPA plate 1 in order to suppress a change in wavelength transmission characteristic with a variation of the ambient temperature or a change in setting of the wavelength dispersion values.

Next, an operation of the present embodiment will be described referring to a flowchart of FIG. 2.

Figure 2:
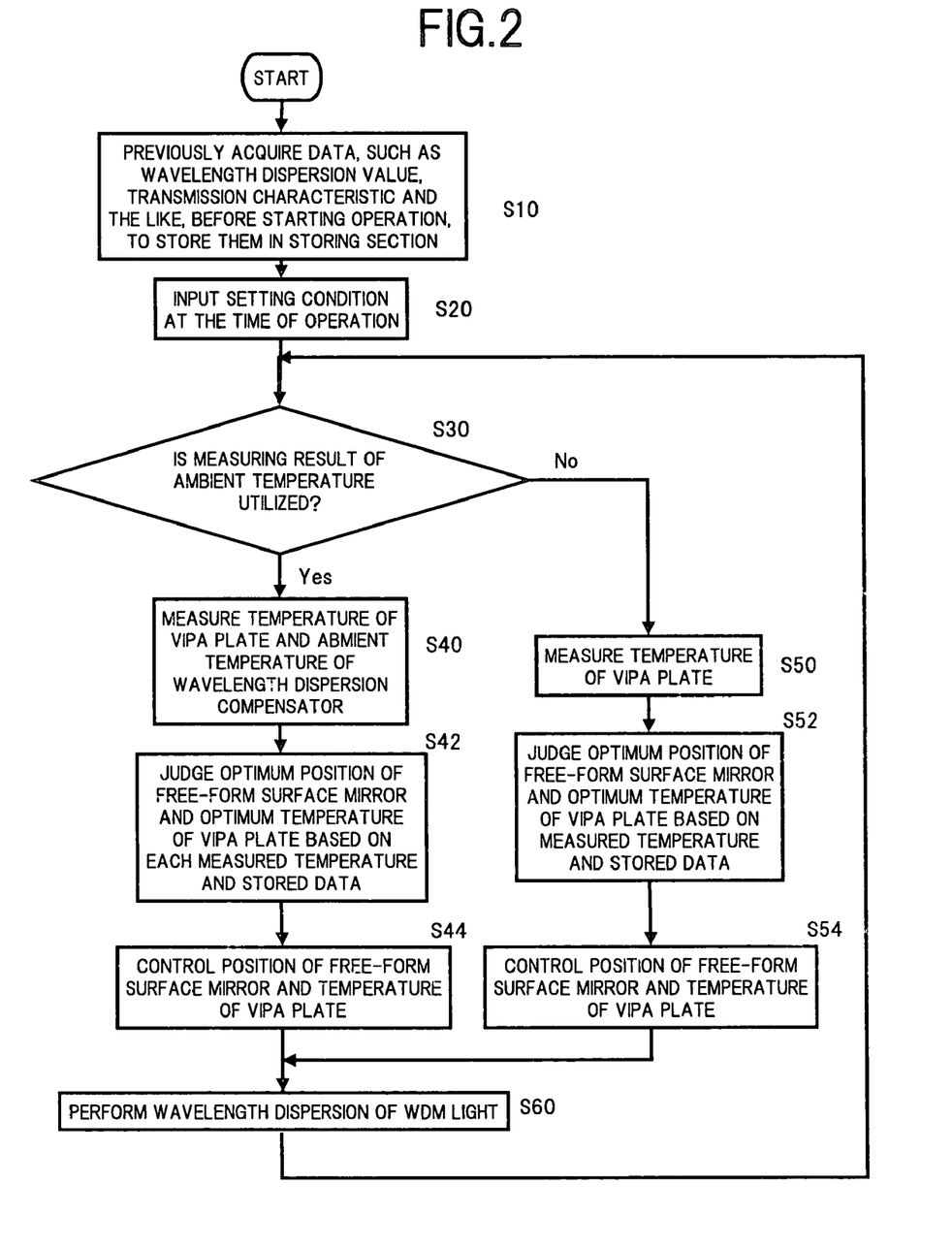
FIG. 2 is a flowchart for explaining an operation of the wavelength dispersion compensator in the above embodiment.

In the wavelength dispersion compensator of the configuration as described above, before starting the wavelength dispersion compensation operation to the WDM light, in step 10 (S10 in the figure, and the same rule is applied herein below) of FIG. 2, various data necessary for the optimizing controls of the position of the free-form surface mirror 7 and the temperature of the VIPA plate 1 by the control section 10 is acquired by the measurement, to be stored in the storing section 11.

The data stored in the storing section 11 includes data of actually obtained wavelength dispersion values for respective wavelengths in a signal light wavelength band, which are measured corresponding to the position of the free-form surface mirror 7. To be specific, the data of the wavelength dispersion values is data indicating a difference between the wavelength dispersion value obtained at the center wavelength used as the reference when designing a shape of the free-form surface mirror 7, and the wavelength dispersion value obtained at another wavelength. Further, the stored data in the storing section 11 also includes data relating to the wavelength transmission characteristic measured corresponding to the temperature of the VIPA plate 1. As the data relating to the wavelength transmission characteristic, there are parameters being references of wavelength transmission characteristic, such as, the center wavelength of etalon periodic transmission band, a minimum insertion loss wavelength in the transmission band, an inflection point wavelength of an insertion loss characteristic in the transmission band and the like. The stored data in the storing section 11 further includes data relating to an error for when the ambient temperature of the wavelength dispersion compensator is varied, for the data relating to the wavelength transmission characteristic corresponding to the temperature of the VIPA plate 1.

Note, the data stored previously in the storing section 11 is acquired by the measurement, here. However, it is also possible to estimate data in another point using polynomial approximation based on data measured in at least two points. Further, the stored data in the storing section 11 is not limited to the above described specific examples, and may be arbitrary data usable for the optimizing controls of the position of the free-form surface mirror 7 and the temperature of the VIPA plate 1.

When the data is stored in the storing section 11 as described above, next, in step 20, a setting condition in the operation time is input to the control section 10. Here, the setting condition to be input includes the setting of the wavelength dispersion values to be compensated in the present wavelength dispersion compensator, wavelength information of the WDM light to be input (to be specific, the number of channels, wavelengths to be used and the like), a wavelength setting condition corresponding to the data relating to the wavelength transmission characteristic described above (to be specific, a condition for defining the periodic transmission band width and the like).

When the input of the setting condition is completed, in step 30, it is judged whether o not the measurement result of the temperature sensor 9b is utilized for the control, according to the degree of accuracy or the like required for the wavelength dispersion compensation. In the case where the higher accurate wavelength dispersion compensation is required, control proceeds to step 40 in order to utilize the measurement result of the temperature sensor 9b for the control, while in the case where the higher accurate wavelength dispersion compensation is not required, control proceeds to step 50.

In step 40, the temperature of the VIPA plate 1 is measured by the temperature sensor 9a, and at the same time, the ambient temperature of the wavelength dispersion compensator is measured by the temperature sensor 9b, and then the signals Ta and Tb indicating the measurement results of the temperature sensors 9a and 9b are output to the control section 10.

In step 42, in the control section 10 that received the output signals Ta and Tb from the temperature sensors 9a and 9b, the stored data in the storing section 11 is read out according to the temperature of the VIPA plate 1 and the ambient temperature of the wavelength dispersion compensator, and an optimum position of the free-form surface 7, at which a desired wavelength dispersion value can be obtained for each wavelength of the WDM light, and the optimum temperature of the VIPA plate 1, at which a substantially fixed wavelength transmission characteristic can be obtained irrespective of the temperature variation or the setting of the wavelength dispersion values, are judged corresponding to the setting condition input in step 20. Note, for the optimum temperature of the VIPA plate 1, the actual temperature of the VIPA plate 1 is corrected according to the ambient temperature of the wavelength dispersion compensator measured by the temperature sensor 9b, so that the wavelength transmission characteristic is fixed at the higher accuracy. Then, in accordance with the judged optimum position of the free-form surface mirror 7, the control signal Cp for controlling the movable stage of the free-form surface mirror 7 is output from the control section 10, and also, in accordance wit the judged optimum temperature of the VIPA plate 1, the control signal Ct for controlling the film heater of the case 8 is output from the control section 10.

In step 44, the movable stage is driven in accordance with the control signal Cp from the control section 10, and the free-form surface mirror 7 is feedforward controlled to the optimum position. Further, the operating state of the film heater is adjusted in accordance with the control signal Ct from the control section 10, and the VIPA plate 1 is feedforward controlled to the optimum temperature.

On the other hand, in the case where the measurement result of the temperature sensor 9b is not utilized, in step 50, the temperature of the VIPA plate 1 is measured by the temperature sensor 9a, and only the signal Ta indicating the measurement result of the temperature sensor 9a is output to the control section 10.

In step 52, in the control section 10 that received the output signal Ta from the temperature sensor 9a, the stored data in the storing section 11 is read out according to the temperature of the VIPA plate 1, and the optimum position of the free-form surface 7, at which a desired wavelength dispersion value can be obtained for each wavelength of the WDM light, and the optimum temperature of the VIPA plate 1, at which a substantially fixed wavelength transmission characteristic can be obtained irrespective of the temperature variation or the setting of the wavelength dispersion values, are judged corresponding to the setting condition input in step 20. Then, in accordance with the judged optimum position of the free-form surface mirror 7, the control signal Cp for controlling the movable stage of the free-form surface mirror 7 is output from the control section 10, and also, in accordance with the judged optimum temperature of the VIPA plate 1, the control signal Ct for controlling the film heater of the case 8 is output from the control section 10.

In step 54, the movable stage is driven in accordance with the control signal Cp from the control section 10, and the free-form surface mirror 7 is feedforward controlled to the optimum position. Further, the operating state of the film heater is adjusted in accordance with the control signal Ct from the control section 10, and the VIPA plate 1 is feedforward controlled to the optimum temperature.

When the feedforward controls of the position of the free-form surface mirror 7 and the temperature of the VIPA plate 1 are completed by the series of processing described above, control proceeds to step 60, where the operation of the present wavelength dispersion compensator is started and then, the wavelength dispersion compensation of the input WDM light is performed.

A specific description is made on the operation of the wavelength dispersion compensator at the operation time. The WDM light is input to the first port of the optical circulator 2, and is sent to the optical fiber 3 via the second port of the optical circulator 2. The WDM light emitted from the optical fiber 3 is converted into a parallel light by the collimate lens 4 and, then, condensed on one segment by the line focal lens 5, to be incident between the opposed parallel planes of the VIPA plate 1, the temperature of which is optimized by the control section 10. Similarly to the conventional case shown in FIG. 8 described above, the incident light on the VIPA plate 1 is multiple reflected repeatedly, between the respective reflective multilayer films 1B and 1C formed on the parallel planes of the VIPA plate 1. At this time, every time the incident light is reflected on the surface of the reflective multilayer film 1B, a few % of the light is transmitted through the surface to be emitted outside the VIPA plate 1.

The light transmitted through the VIPA plate 1 interferes mutually, so that a plurality of optical beams, traveling directions of which are different from each other according to wavelengths, are formed. The optical beams of respective wavelengths emitted in different directions from the reflective multilayer film 1B of the VIPA plate 1, are condensed by the convergent lens 6, and then, reflected at different positions on the central axis of the free-form surface mirror 70. Then, the lights of respective wavelengths reflected by the free-form mirror 7 travel in opposite directions along the optical paths through which the lights have been propagated before reflected, and passes through the convergent lens 6, the VIPA plate 1, the line focal lens 5, the collimate lens 4 and the optical fiber 3 successively, to be output from the third port of the optical circulator 2. As a result, the WDM light input to the present wavelength dispersion compensator, is subjected to the wavelength dispersion compensation by a required amount set according to the position of the free-form surface mirror 7, to be output from the wavelength dispersion compensator.

During the series of processing in the operation time is performed, each processing in step 30, and steps 40 to 44 or steps 50 to 54, is repeatedly executed, so that the position of the free-form surface mirror 7 and the temperature of the VIPA plate 1 are feedback controlled. According to such feedback controls, it becomes possible to perform the wavelength dispersion compensation in stable.

Figure 3:
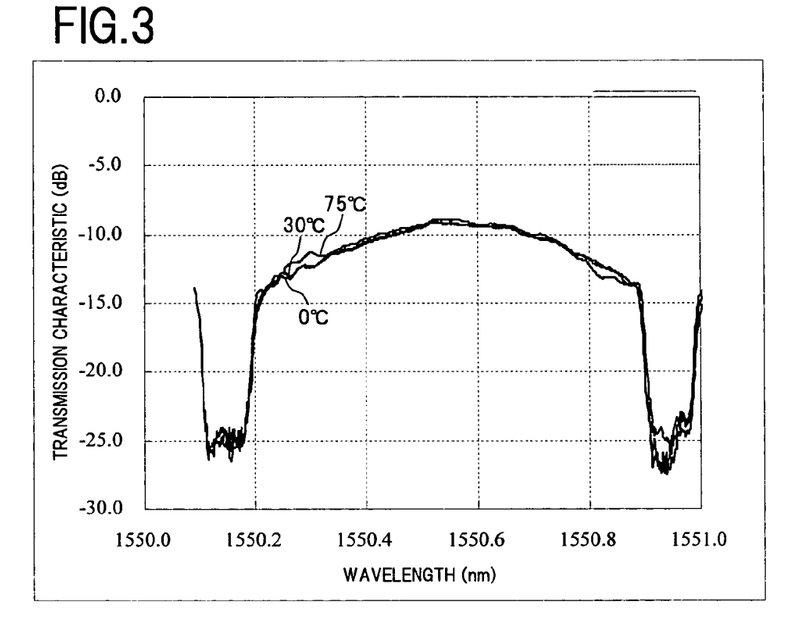
FIG. 3 is a characteristic diagram showing one example of a wavelength transmission characteristic relative to a temperature variation in the wavelength dispersion compensator in the above embodiment.
Figure 4:
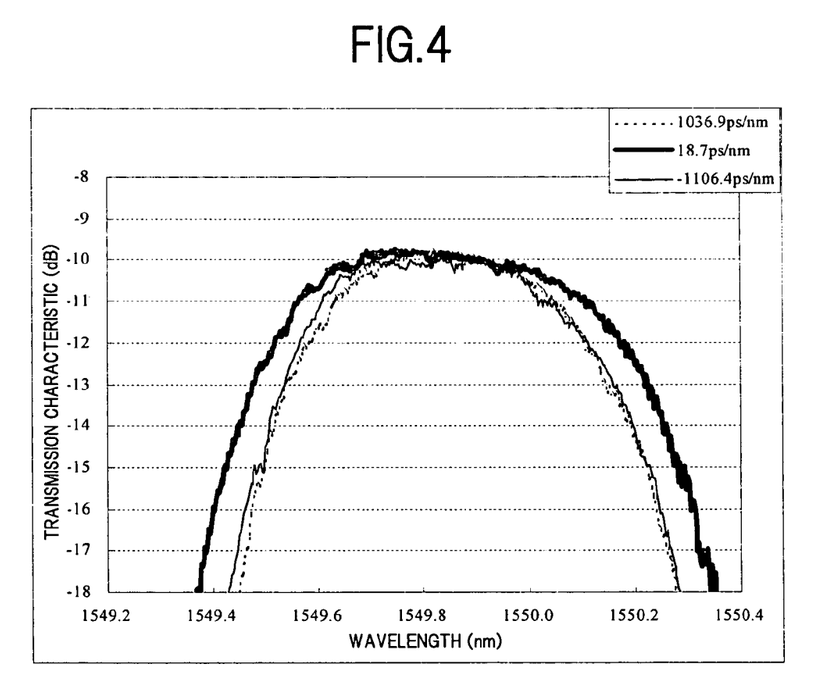
FIG. 4 is a characteristic diagram showing one example of the wavelength transmission characteristic for when the setting of wavelength dispersion values is changed in the wavelength dispersion compensator in the above embodiment.

FIG. 3 and FIG. 4 show examples of the wavelength transmission characteristic realized by the present wavelength dispersion compensator. To be specific, FIG. 3 shows the respective wavelength transmission characteristics for when the ambient temperature of the wavelength dispersion compensator is varied to 0° C., 30° C. and 75° C., and FIG. 4 shows the respective wavelength transmission characteristics for when the setting of the wavelength dispersion values is changed to 1036.9 ps/nm, 18.7 ps/nm and −106.4 ps/nm.

As shown in FIG. 3, according to the present wavelength dispersion compensator, even if the ambient temperature is varied within a range of 0° C. to 75° C., by controlling the temperature of the VIPA plate 1 by the film heater, it is possible to maintain the wavelength transmission characteristic to be substantially fixed utilizing the shit of the wavelength transmission characteristic in the wavelength axis direction as shown in FIG. 10 described above. Further, as shown in FIG. 4, even if the setting of the wavelength dispersion values is changed, since the center wavelengths of the transmission band or the minimum insertion loss wavelengths in the transmission band are substantially the same value, it is possible to suppress the change in the wavelength transmission characteristic as in the conventional case shown in FIG. 11 described above.

Note, in the example of FIG. 4, there is shown the case where the center wavelengths of the transmission band or the minimum insertion loss wavelengths in the transmission band are substantially the same. However, for example, when there exist inflection points at which an insertion loss becomes maximal in the transmission band, it is possible to control the temperature of the VIPA plate 1 so that inflection point wavelengths are substantially the same value.

As described above, according to the wavelength dispersion compensator of the present embodiment, by optimizing the position of the free-form surface mirror 7 so as to correspond to the wavelengths of the WDM light, the wavelength dependence of the wavelength dispersion values can be reduced. Further, by optimizing the temperature of the VIPA plate 1, the change in the wavelength transmission characteristic with the variation of ambient temperature or the change in setting of the wavelength dispersion values, can be efficiently suppressed. As a result, it becomes possible to realize the stable wavelength dispersion compensation for arbitrary wavelengths of the WDM light.

Next, an optical transmission network configured using the wavelength dispersion compensator of the present invention will be described.

Figure 5:
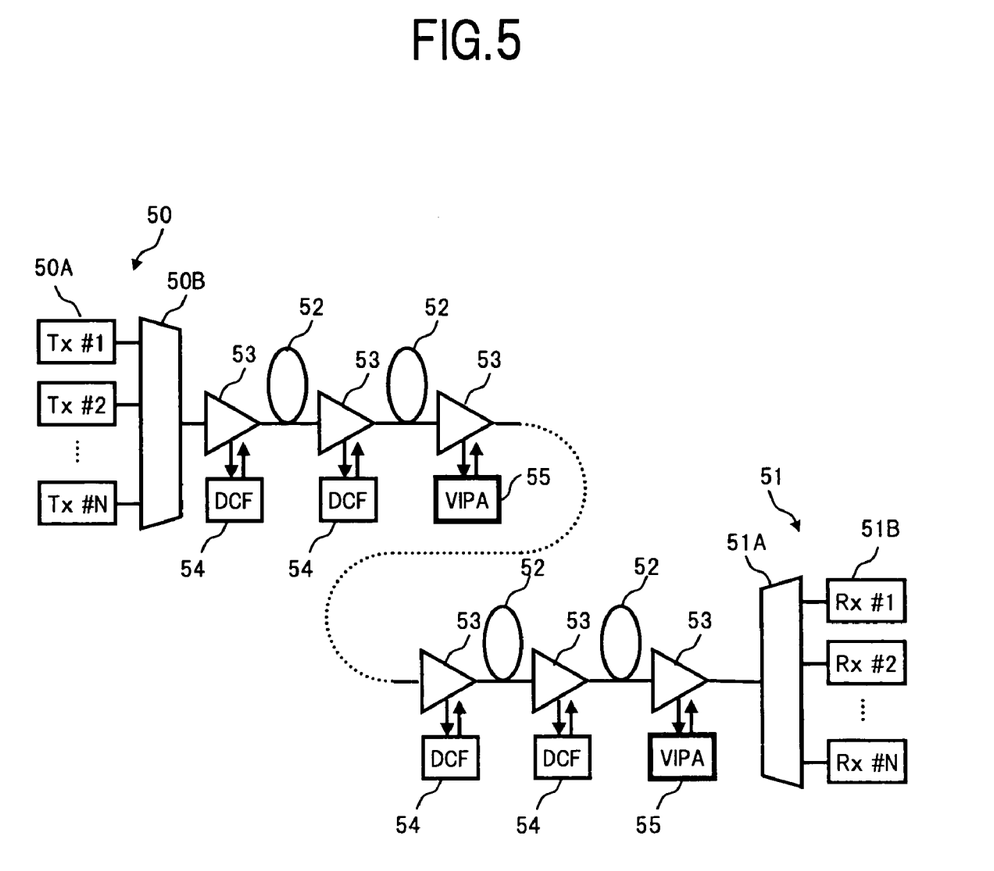
FIG. 5 is a functional block diagram showing a configuration of one embodiment of an optical transmission network according to the present invention.

FIG. 5 is a functional block diagram showing a configuration of one embodiment of the optical transmission network.

In FIG. 5, the present optical transmission network is configured such that, for example, an optical transmission station 50 and an optical reception station 51 are connected with each other via an optical fiber transmission path 52, optical amplifiers 53 are arranged on the optical fiber transmission path 52 at required repeating intervals, and each optical amplifier 53 is connected with a dispersion compensation fiber (DCF) 54 capable of compensating for the wavelength dispersion occurred in the WDM light that has been transmitted over each repeating interval or a wavelength dispersion compensator (VIPA) 55 according to the present invention described above.

The optical transmission station 50 includes, for example, optical transmitters (Tx#1 to Tx#N) 50A generating optical signals of N waves having different wavelengths, and a WDM coupler 50B multiplexing the optical signals output from the respective optical transmitters 50A to transmit the WDM light to the optical fiber transmission path 52. The optical reception station 51 includes a WDM coupler 51A demultiplexing the WDM light that has been repeatedly transmitted via the optical fiber transmission path 52 and the optical amplifiers 53, and optical receivers (Rx#1 to Rx#N) 51B receiving to process the demultiplexed optical signals of N waves. As the optical fiber transmission path 52, there is used a typical optical transmission fiber, for example, a single-mode fiber, a dispersion-shifted fiber or the like.

Each optical amplifier 53 is a known optical amplifier, such as a rare-earth element doped optical fiber amplifier capable of amplifying collectively the WDM light transmitted over the optical fiber transmission path 52 up to a required level, a Raman amplifier or a semiconductor optical amplifier. The dispersion compensation fiber 54 is a known dispersion compensation fiber capable of taking out the WDM light from a required position within the optical amplifier 53 to compensate for the wavelength dispersion occurred in the WDM light. In this embodiment, the dispersion compensation fiber 54 to be connected with the optical amplifier 53 is replaced by the VIPA-type wavelength dispersion compensator 55 to which the present invention is applied, for each of the previously set number of repeating intervals.

In the optical transmission network of the configuration as described above, the WDM light transmitted from the optical transmission station 50 is repeatedly transmitted to the optical reception station 51 via the optical fiber transmission path 52 and the optical amplifiers 53. The wavelength dispersion occurred in each repeating interval during the WDM light is repeatedly transmitted, is compensated by the dispersion compensation fiber 54 or the VIPA-type wavelength dispersion compensator 55 connected with the optical amplifier in each repeating interval. In particular, since the compensation amount in the wavelength dispersion compensation performed by the VIPA-type wavelength dispersion compensator 55 can be arbitrarily set corresponding to the wavelengths as described above, it becomes possible to compensate collectively for the wavelength dispersion, which could not be compensated by the dispersion compensation fiber 54 by which the wavelength dispersion compensation amount is fixed, and thus accumulated, by the VIPA-type wavelength dispersion compensator 55. Thus, it becomes possible to reliably compensate for the wavelength dispersion occurred in the WDM light transmitted between the optical transmission station 50 and the optical reception station 51, thereby enabling the realization of the stable repeated transmission of the WDM light.

In the optical transmission network of the above embodiment, there has been shown the example in which the VIPA-type wavelength dispersion compensator 55 to which the present invention is applied, is arranged for each of the previously set number of repeating intervals. However, the configuration may be such that the wavelength dispersion compensation in all of the repeating intervals is performed by the VIPA-type wavelength dispersion compensators 55 according to the present invention. Further, the description has been made on the case where the dispersion compensation fiber 54 or the VIPA-type wavelength dispersion compensator 55 is connected with the optical amplifier 53. However, the present invention is not limited thereto, and it is surely possible to arrange the dispersion compensation fiber 54 or the VIPA-type wavelength dispersion compensator 55 in an arbitrary position on the optical fiber transmission path, to perform the wavelength dispersion compensation of the WDM light.

What is claimed is:

1. A control method of a wavelength dispersion compensator which comprises: an optical component provided with a demultiplexing function, including a device having two reflective surfaces which are opposed and parallel to each other, in which a light condensed in a one-dimensional direction is incident between said reflective surfaces of the device, and a part of said incident light is transmitted through one of said reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said control method comprising:

acquiring to store data relating to wavelength dispersion values in respective wavelengths in a wavelength band of the incident light so as to correspond to a position of said reflector, before starting an operation of wavelength dispersion compensation by said wavelength dispersion compensator;

inputting a setting condition inclusive of the wavelength dispersion values to be compensated at an operation time and wavelength information of the incident light;

reading out the data corresponding to said setting condition from said stored data, and based on said read data, judging a position of said reflector, which enables the reduction of wavelength dependence of the wavelength dispersion values in the operation time; and controlling the position of said reflector in accordance with a judgment result, to start the operation of wavelength dispersion compensation.

2. A control method of a wavelength dispersion compensator which comprises: an optical component provided with a demultiplexing function, including a device having two reflective surfaces which are opposed and parallel to each other, in which a light condensed in a one-dimensional direction is incident between said reflective surfaces of the device, and a part of said incident light is transmitted through one of said reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said control method comprising:

acquiring to store data relating to a wavelength transmission characteristic of said optical component so as to correspond to a temperature of said optical component, before starting an operation of wavelength dispersion compensation by said wavelength dispersion compensator;

inputting a setting condition inclusive of wavelength dispersion values to be compensated at an operation time and wavelength information of the incident light;

measuring the temperature of said optical component;

reading out the data corresponding to said setting condition and the temperature of said optical component from said stored data, and based on said read data, judging the temperature of said optical component, at which a parameter being a reference of the wavelength transmission characteristic of said optical component is substantially fixed; and controlling the temperature of said optical component in accordance with a judgment result, to start the operation of wavelength dispersion compensation.

3. A control method of a wavelength dispersion compensator according to claim 2, wherein data relating to an error for when an ambient temperature of said wavelength dispersion compensator is varied, is acquired to be stored for a wavelength transmission characteristic corresponding to the temperature of said optical component, before starting the operation of wavelength dispersion compensation by said wavelength dispersion compensator,
the ambient temperature of said wavelength dispersion compensator is measured, and
said stored data is read out according to said measured ambient temperature of the wavelength dispersion compensator, and in accordance with said read data, said judged temperature of the optical component is corrected.

4. A control method of a wavelength dispersion compensator according to claim 2,
wherein, after starting the operation of wavelength dispersion compensation, the temperature of said optical component is measured, and said stored data is read out according to said measured temperature of the optical component, to feedback control the temperature of said optical component based on said read data.

5. A control method of a wavelength dispersion compensator according to claim 2,
wherein a parameter being a reference of the wavelength transmission characteristic of said optical component is a center wavelength of a transmission band.

6. A control method of a wavelength dispersion compensator according to claim 2,
wherein a parameter being a reference of the wavelength transmission characteristic of said optical component is a minimum insertion loss wavelength within a transmission band.

7. A control method of a wavelength dispersion compensator according to claim 2,
wherein a parameter being a reference of the wavelength transmission characteristic of said optical component is an inflection point wavelength of an insertion loss characteristic in a transmission band.

8. A control method of a wavelength dispersion compensator which comprises: an optical component provided with a demultiplexing function, including a device having two reflective surfaces which are opposed and parallel to each other, in which a light condensed in a one-dimensional direction is incident between said reflective surfaces of the device, and a part of said incident light is transmitted through one of said reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said control method comprising:
acquiring to store data relating to wavelength dispersion values in respective wavelengths in a wavelength band of the incident light so as to correspond to a position of said reflector, and also acquiring to store data relating to a wavelength transmission characteristic of said optical component so as to correspond to a temperature of said optical component, before starting an operation of wavelength dispersion compensation by said wavelength dispersion compensator;
inputting a setting condition inclusive of the wavelength dispersion values to be compensated at an operation time and wavelength information of the incident light;
measuring the temperature of said optical component;
reading out the data corresponding to said setting condition and the temperature of said optical component from said stored data, and based on said read data, judging the position of said reflector, which enables the reduction of wavelength dependence of the wavelength dispersion values in the operation time, and also judging the temperature of said optical component, at which a parameter being a reference of the wavelength transmission characteristic of said optical component is substantially fixed; and
controlling a position of said reflector and the temperature of said optical component in accordance with a judgment result, to start the operation of wavelength dispersion compensation.

9. A wavelength dispersion compensator which comprises: an optical component provided with a demultiplexing function, including a device having two reflective surfaces which are opposed and parallel to each other, in which a light condensed in a one-dimensional direction is incident between said reflective surfaces of the device, and a part of said incident light is transmitted through one of said reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said wavelength dispersion compensator comprising:
a storing section that acquires to store data relating to wavelength dispersion values in respective wavelengths in a wavelength band of the incident light so as to correspond to a position of said reflector, before starting an operation of wavelength dispersion compensation;
a position adjusting section that variably changes a position of said reflector; and
a control section that receives a setting condition inclusive of the wavelength dispersion values to be compensated at an operation time and wavelength information of the incident light; reads out the data corresponding to said setting condition from said stored data, and based on said read data, judges the position of said reflector, which enables the reduction of wavelength dependence of the wavelength dispersion values in the operation time, to control the position of said reflector in accordance with a judgment result.

10. A wavelength dispersion compensator which comprises: an optical component provided with a demultiplexing function, including a device having two reflective surfaces which are opposed and parallel to each other, in which a light condensed in a one-dimensional direction is incident between said reflective surfaces of the device, and a part of said incident light is transmitted through one of said reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said wavelength dispersion compensator comprising:
a storing section that acquires to store data relating to a wavelength transmission characteristic of said optical component so as to correspond to the temperature of said optical component, before starting an operation of wavelength dispersion compensation;

a first temperature sensor measuring the temperature of said optical component;

a temperature adjusting section that variably changes the temperature of said optical component; and a control section that receives a setting condition inclusive of wavelength dispersion values to be compensated at an operation time and wavelength information of the incident light; reads out the data corresponding to said setting condition and the measured temperature by said first temperature sensor from said stored data, and based on said read data, judges the temperature of said optical component, at which a parameter being a reference of a wavelength transmission characteristic of said optical component is substantially fixed, to control said temperature adjusting section in accordance with a judgment result.

11. A wavelength dispersion compensator according to claim 10, further comprising;

a second temperature sensor measuring an ambient temperature, wherein said storing section previously stores data relating to an error for when the ambient temperature is varied for the wavelength transmission characteristic corresponding to the temperature of said optical component, and said control section reads out the data stored in said storing section according to the ambient temperature measured by said second temperature sensor, and in accordance with said read data, corrects said judged temperature of the optical component.

12. A wavelength dispersion compensator according to claim 10, wherein, after starting the operation of wavelength dispersion compensation, said control section reads out the data stored in said storing section according to the temperature of said optical component measured by said first temperature sensor, to feedback control said temperature adjusting section based on said read data.

13. A wavelength dispersion compensator which comprises: an optical component provided with a demultiplexing function, including a device having two reflective surfaces which are opposed and parallel to each other, in which a light condensed in a one-dimensional direction is incident between said reflective surfaces of the device, and a part of said incident light is transmitted through one of said reflective surfaces while said incident light being multiple-reflected on the reflective surfaces, to be emitted, and said emitted light interferes mutually, so that optical beams traveling directions of which are different from each other according to wavelengths are formed; and a reflector reflecting, at a previously set position, optical beams of respective wavelengths emitted from one of the reflective surfaces of said optical component in different directions to return the optical beams to said optical component, respectively, said wavelength dispersion compensator comprising:

a storing section that stores data relating to wavelength dispersion values in respective wavelengths in a wavelength band of the incident light, which is acquired so as to correspond to a position of said reflector, and also stores data relating to a wavelength transmission characteristic of said optical component, which is acquired so as to correspond to a temperature of said optical component, before starting an operation of wavelength dispersion compensation;

a position adjusting section that variably changes the position of said reflector;

a first temperature sensor measuring the temperature of said optical component;

a temperature adjusting section that variably changes the temperature of said optical component; and a control section that receives a setting condition inclusive of the wavelength dispersion values to be compensated at an operation time and wavelength information of the incident light, reads out the data corresponding to said selling condition and the temperature measured by said first temperature sensor from the data stored in said storing section, and based on said read data, judges the position of said reflector, which enables the reduction of wavelength dependence of the wavelength dispersion values in the operation time, and also judges the temperature of said optical component, at which a parameter being a reference of the wavelength transmission characteristic of said optical component is substantially fixed, to control the position adjusting section and said temperature adjusting section in accordance with a judgment result.

14. An optical transmission network transmitting a signal light between an optical transmission station and an optical reception station via an optical fiber transmission path, wherein the compensation of wavelength dispersion occurred in the signal light transmitted over said optical fiber transmission path is performed using the wavelength dispersion compensator in any one of claims 9 to 13.

* * * * *

UNITED STATES PATENT AND TRADEMARK OFFICE
CERTIFICATE OF CORRECTION

PATENT NO. : 7,418,206 B2 Page 1 of 1
APPLICATION NO. : 10/808579
DATED : August 26, 2008
INVENTOR(S) : Yuichi Kawahata It is certified that error appears in the above-identified patent and that said Letters Patent is hereby corrected as shown below:

Column 15, Line 18, change "comprising;" to --comprising:--.

Column 16, Line 28, change "selling" to --setting--.

Signed and Sealed this

Fourth Day of November, 2008

JON W. DUDAS
*Director of the United States Patent and Trademark Office*